March 6, 1962 F. SECRETAN 3,024,417

PROPORTIONAL DIGITAL SYNCHRONIZER

Filed Jan. 7, 1960 4 Sheets-Sheet 1

INVENTOR.

FRANK SECRETAN

BY Moody and Goldman

ATTORNEYS

March 6, 1962 F. SECRETAN 3,024,417

PROPORTIONAL DIGITAL SYNCHRONIZER

Filed Jan. 7, 1960 4 Sheets-Sheet 2

INVENTOR.

FRANK SECRETAN

BY Moody and Goldman

ATTORNEYS

March 6, 1962 F. SECRETAN 3,024,417

PROPORTIONAL DIGITAL SYNCHRONIZER

Filed Jan. 7, 1960 4 Sheets-Sheet 3

INVENTOR.
FRANK SECRETAN
BY Moody and Goldman
ATTORNEYS

March 6, 1962 F. SECRETAN 3,024,417

PROPORTIONAL DIGITAL SYNCHRONIZER

Filed Jan. 7, 1960 4 Sheets-Sheet 4

INVENTOR.
FRANK SECRETAN
BY Mooby and Goldman
ATTORNEYS

United States Patent Office 3,024,417

Patented Mar. 6, 1962

3,024,417

PROPORTIONAL DIGITAL SYNCHRONIZER

Frank Secretan, Cedar Rapids, Iowa, assignor to Collins Radio Company, Cedar Rapids, Iowa, a corporation of Iowa Filed Jan. 7, 1960, Ser. No. 1,087

9 Claims. (Cl. 328—42)

This invention relates to synchronizers that lock the phase of a locally-generated frequency to that of a received frequency in a manner that stores the locked phase, so that if the received frequency is lost or discontinued, the phase-lock is retained for the locally-generated frequency. In particular, this invention relates to a phase-storing synchronizer that includes an internal digital operation to obtain synchronization.

It is an object of this invention to provide a synchronizer that digitally varies the rate of an internal pulse source to bring it into synchronization by discrete phase changes. The farther the system is from synchronization (up to ±90°), the greater is the rate that the invention brings itself toward synchronization.

It is another object of the invention to provide a synchronizer without mechanically moving parts, wherein there is no phase drifting of its generated input frequency when its error correcting signal is lost or discontinued.

The invention is an improvement on the general system of obtaining synchronization by the addition or deletion of high rate pulses to the input of a pulse-rate divider, which provides a locally-generated output at a required frequency. Very briefly, this invention varies the rate that pulses are added or deleted at the input of the divider as a function of an error-angle that the system is away from synchronization. The invention uses a delay line that has an input connected to a source of short duty-cycle pulses having a stable rate. The length of the delay line is preferably about one period of the frequency of its input pulses. A plurality of "and" gates have respective inputs connected to output taps spaced along the delay line. A variable one-shot multivibrator has an output connected to another input of each of the "and" gates. The "and" gates have outputs connected in common to an input of a pulse rate divider. The one-shot is triggered by the output of the pulse source. An output of a phase detector is connected to a control input of the one-shot to vary its pulse duration. Hence, the number of "and" gates that provide an output is a function of the pulse duration, which is controlled by the phase-detector output. One input to the phase detector receives a reference signal provided from a source external to the invention. A second input of the phase detector is connected to an output of the pulse-rate divider. The output of the invention is obtained from the output of its pulse-rate divider, and it is phase-locked with the reference signal.

Further objects, features and advantages of this invention will become apparent to one skilled in the art upon further study of the specification and accompanying drawings, in which.

Figure 1:
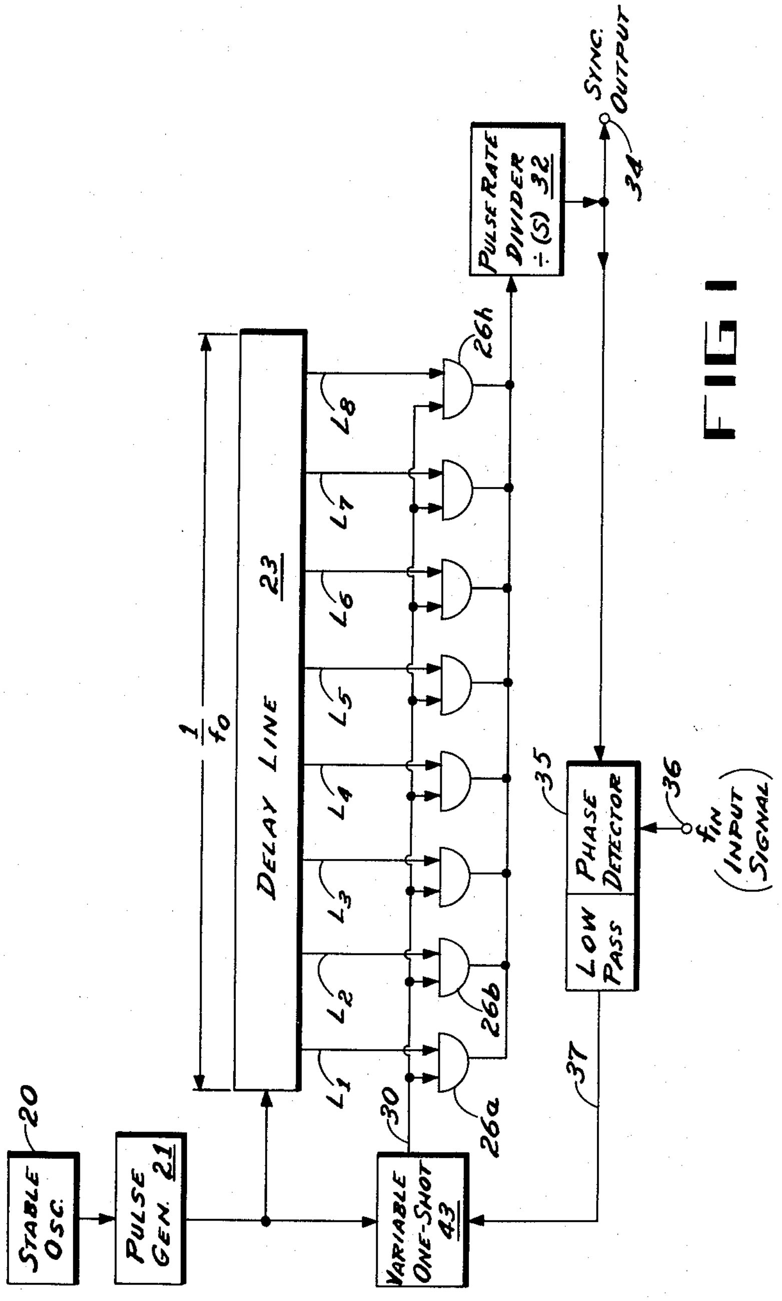
FIGURE 1 is one embodiment of the invention.
Figure 3:
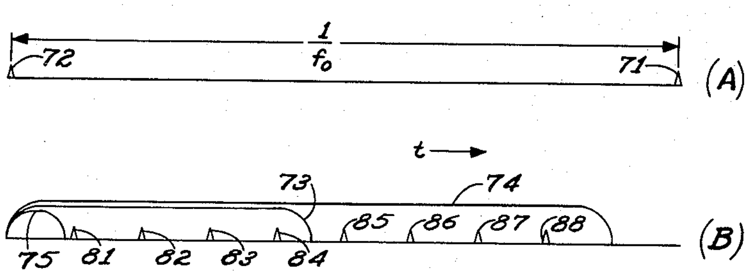

FIGURES 3(A) and (B) show wave-forms used in explaining the operation of FIGURE 1.

Figure 4:
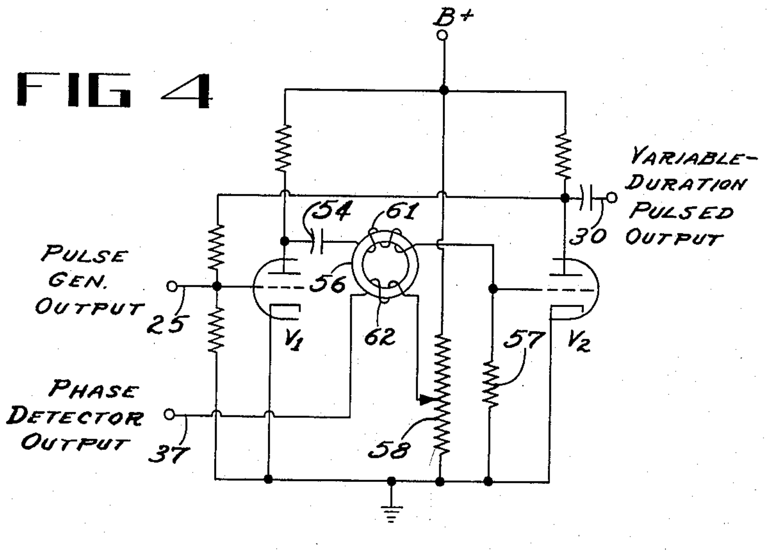

FIGURE 4 illustrates a detailed form of a variable one-shot multivibrator.

Figure 2:
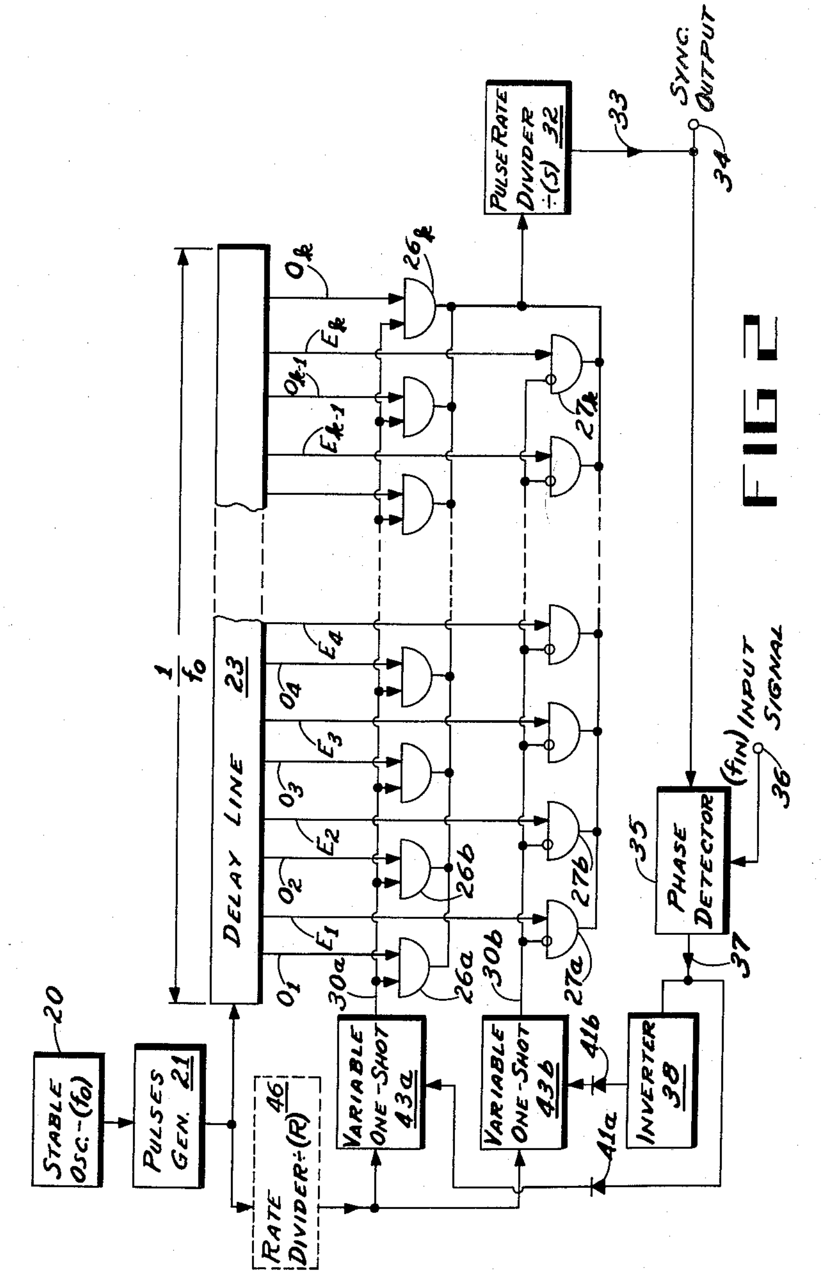
FIGURE 2 is another embodiment of the invention.
Figure 5:
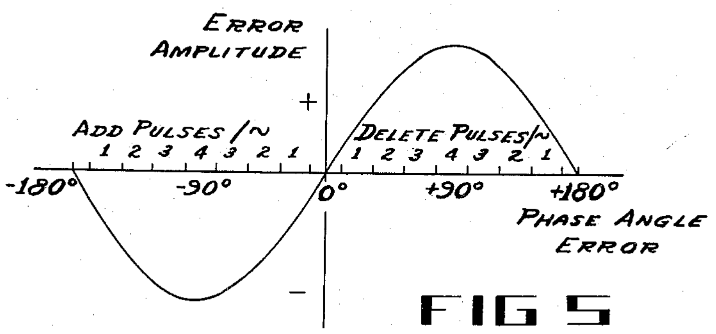
Figure 6:
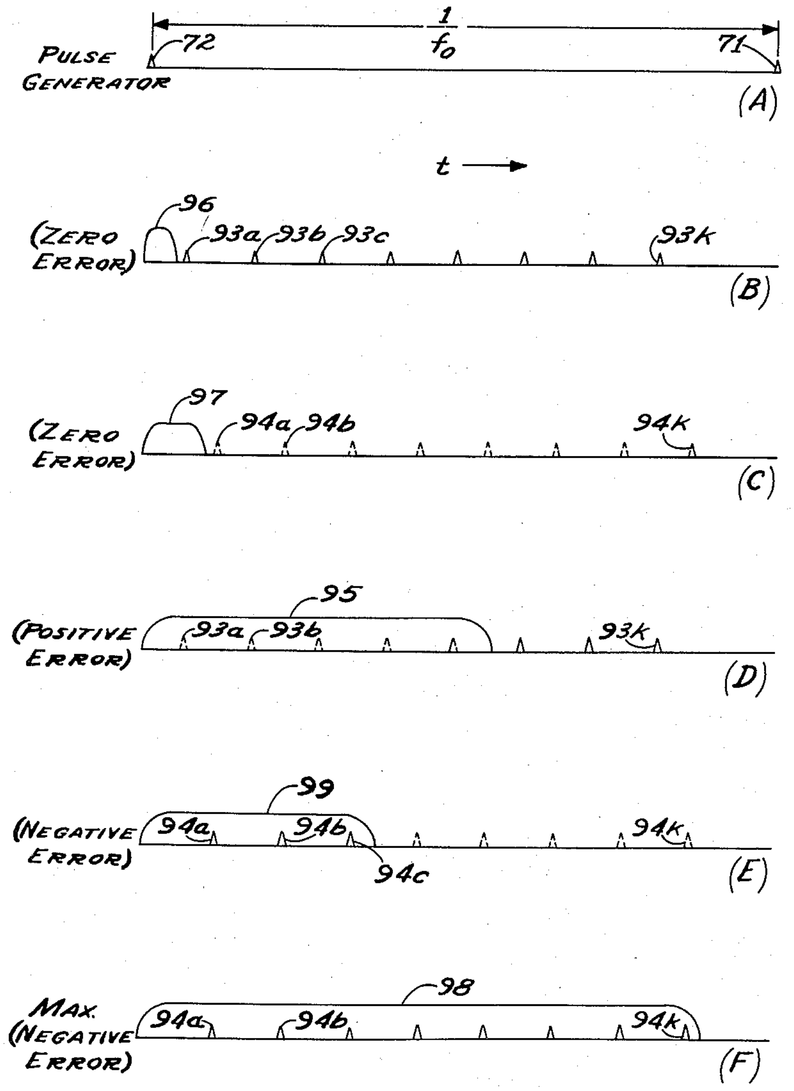

FIGURE 5 illustrates the response of a phase-detector usable in the invention, and, FIGURES 6(A) and (F) provide waveforms used in explaining the embodiment of FIGURE 2.

The system in FIGURE 1 includes a stable oscillator 20 which may be a crystal oscillator providing an output frequency $f_o$. A pulse generator 21 is connected to the oscillator output and forms pulses having a short-duty cycle and a stable rate.

A delay line 23 has an input connected to an output of pulse generator 21. The over-all length of delay line 23 provides a delay of about $$\frac{1}{f_o}$$

A plurality of equally spaced output taps $L_1$–$L_8$ are provided along delay line 23.

A plurality of "and" gates **26*a–h* each have an input connected to a respective one of the taps $L_1$–$L_8$. A pulse-rate divider 32 has an input connected in common to the outputs of "and" gates 26*a–h*. The output of divider 32 is connected to a terminal 34 to provide the synchronous output of the system. Generally, the division ratio S of divider 32** is large so that each received pulse represents only a very small fraction of a cycle of the divider output; the fraction becomes smaller as the division ratio becomes greater.

A phase detector 35 of conventional type has an input connected to the output of divider 32. A conventional low-pass filter is provided at the output of phase detector 35. A bandpass filter may be provided at the divider input to the phase detector in order to filter only the fundamental frequency of the divider pulses; however, if the divider output has a square-wave form, no filter is needed since the square-wave form is compatible with phase-detector operation.

Another input of the phase detector is connected to a terminal 36 to receive a reference frequency $f_{in}$, which is provided from some external source (not shown). The purpose of the invention is to phase-lock the local signal provided at terminal 34 with the received signal at terminal 36. Phase-lock occurs when its two inputs are 90° apart, when detector 35 is the most common type; however fixed phase-shifters (not shown) may be connected to terminal 34 to provide a synchronous output with any required phase relative to reference frequency $f_{in}$.

A variable one-shot multivibrator 43 is provided which has a trigger input connected to the output of pulse generator 21. Each pulse from generator 21 triggers variable one-shot 43 to provide an output pulse on a lead 30, that enables an input of each of "and" gates **26*a–h*. However, the duration of each output pulse from the one-shot is controlled by output 37 from phase detector 35, which is connected to a control input of variable one-shot 43**.

A form of variable one-shot 43 is shown in FIGURE 4. It includes conventional one-shot circuitry, except for the addition of a saturable reactor 56, which has its inductively controlled winding 61 serially connected with a capacitor 54 and a resistor 57, which together determine the pulse-duration for the circuit output on lead 30. The duration of pulses from the one-shot is varied by controlling the direct-current through a control winding 62. One side of control winding 62 is connected to the tap of a potentiometer 58, which is a voltage divider connected across a B+ power source. The position of the potentiometer tap determines the steady-state current in control winding 62 and thus the steady-state duration of the pulses on output lead 30. The steady-state situation is obtained when there is no current supplied from phase-detector output lead 37, which is obtained during synchronization. When a positive current is provided on lead 37, the pulse-duration increases; and when the current is negative, the pulse-duration decreases.

FIGURE 3(A) illustrates the pulsed output from generator 21. A pulse 71 has passed to the end of the delay line when a next pulse 72 begins, due to the choice of $1/f_o$ as the delay-line length. Pulses 81–88 in FIGURE 3(B) appear at the respective output taps $L_1$–$L_8$. Variable one-shot 43 has its steady-state pulse duration adjusted so that it is approximately equal to $$\frac{1}{2f_o}$$

which is shown as pulse 73 in FIGURE 3(B) that terminates between pulses 84 and 85. Under these circumstances, only one-half of the "and" gates are enabled when a pulse reaches them as it travels down the delay line. Accordingly, output pulses are provided only from the first four "and" gates when synchronization exists. Hence, four pulses per pulse from generator 21 are provided at the input to divider 32 under synchronous conditions. The division ratio S is adjusted so that when four pulses per generator cycle are provided, the divider output frequency is equal to frequency $f_{in}$ provided at terminal 36. A division ratio of 360, for example, will allow each divider input pulse to correspond to 1° of phase change at the divider output.

By increasing or decreasing the pulse duration, either more or less than four pulses per generator pulse triggers the divider input. Pulses 74 and 75 in FIGURE 3(B) show the extremes of pulse durations that either pass or block all tapped outputs.

If the phase of the divider output is not correct, a direct-current output is provided from phase detector 35 having a response of the type illustrated in FIGURE 5. If the phase-detector output is positive, the pulse duration from the one-shot becomes shorter. Thus, as the pulse length becomes shorter, fewer than four pulses per-generator-pulse trigger divider 32. If the pulse length decreases by 25%, three pulses-per-generator-pulse are provided instead of four, which is a one pulse per $f_o$ cycle less than the steady-state rate. And, if the pulse duration becomes still shorter, the divider input will receive only two, one, or no pulses-per-$f_o$-cycle depending upon the value of the control voltage provided from the phase detector. Accordingly, the magnitude of the control voltage determines how fast the system can approach synchronization.

If the system is out-of-phase in the opposite direction, the pulse duration becomes longer than the steady-state length 73 to pass from five to eight pulses-per-$f_o$ cycle, depending upon the magnitude of the negative phase-detector output. Consequently, an out-of-synchronization condition will cause either more or less pulses to pass to the divider input; and each pulse-per-$f_o$-cycle greater or less than the normal four pulses will shift the divider output toward synchronization by an amount dependent upon the division ratio. The greater the system is out-of-synchronization, up to a limit of 90°, the greater is the rate at which the system is made to approach synchronization. As the system comes closer to synchronization, the rate of approach slows down in digital steps. For phase errors between (90° to 180°), the system pulls itself toward synchronization with a rate of approach that increases in digital steps. The rate variation is evident from FIGURE 5 by the number of pulses added or deleted per $f_0$ cycle in response to the value of the phase-detector output. An unstable condition is provided about 180°.

The system of FIGURE 2 eliminates the need for using a one-shot that can both increase and decrease its pulse duration. Rather, in the system of FIGURE 2, each of the one-shots 43a and b varies its pulse duration in only a single direction from a steady-state value. The one-shots are separately actuated according to the polarity of the phase detector output. For example, each one-shot in FIGURE 2 can provide minimum duration pulses with zero phase-detector current; and its pulse duration increases as its received phase-detector current increases.

A diode 41a is interposed between the phase-detector output 37 and one-shot 43a; while a diode 41b and an inverter 38 are interposed between phase detector output 37 and one-shot 43b. The inverter 38 and diodes 41a and b assure that each of the one-shots are controlled by only one of the respective polarities from the phase detector output. That is, one-shot 43a has its pulse duration increased only as the positive polarity output of the phase detector increases; and one-shot 43b has its pulse duration increased only as the magnitude of the negative polarity output of phase detector 35 increases.

Two banks of "and" gates are provided in FIGURE 2, and they are banks 26 and 27. "And" gates 26a–k comprise the first bank and have inputs respectively connected to the odd output taps $O_1$–$O_k$ of delay line 23. In a like manner, the second bank comprising "and" gates 27a–27k have inputs respectively connected to even taps $E_1$–$E_k$ of the delay line. "And" gates 26 in the first bank are normally disabled, and are enabled by output pulses from one-shot 43a provided on a lead 30a. "And" gates 27 in the second bank are normally enabled, and are disabled by the output pulses from one-shot 43b provided on lead 30b. The outputs of the "and" gates of both banks are connected in common to the input of pulse divider 32. It may be desirable to connect the outputs of the "and" gates in common through an "or" gate (not shown) to the divider input in order to isolate the "and" gate outputs from each other.

Another pulse-rate divider 46 is shown in FIGURE 2 and may or may not be included in it, as desired; that is, a direct connection may be provided between each one-shot and generator 21, as shown in FIGURE 1, or on the other hand, divider 46 may be added in FIGURE 1 or FIGURE 2, if desired. The purpose of divider 46 is to slow down the average rate at which the system can approach synchronization, and it will be slowed down by the amount of its division ratio R. However, divider 46 does not change the relative range of rate variation of the system.

The other items in FIGURE 2 can be the same as those shown in FIGURE 1.

The operation of the system in FIGURE 2 can be described with the assistance of FIGURES 6(A)–(F). It is presumed in this example of operation that divider 46 is either not used or has a division ratio of one. FIGURE 6(A) illustrates delay line pulses 71 and 72 in the same manner as FIGURE 3(A). FIGURE 6(B) shows pulses 93a–k, which are provided at odd taps $O_1$–$O_k$.

A pulse 96, in FIGURE 6(B) illustrates the output pulse of one-shot 43a in response to a generator pulse, when there is zero error output from the phase detector; that is, when the system is synchronized. It is important that pulse 96 terminates before first tap pulse 93a, so that none of the odd-tap pulses are blocked and all pass to the divider input.

In a like manner, FIGURE 6(C) shows pulses 94a–k, which are provided at even taps $E_1$–$E_k$. A pulse 97 in this figure shows the output of one-shot 43b, when there is zero error; and thus, none of pulses 94a–k can pass through gates 27a–k, to the divider input. Hence, pulse 97 must terminate before pulse 94a.

Consequently, in the zero error voltage condition, only the pulses from the odd taps are provided to the divider input; and its division rate is determined by dividing that number of pulses per-generator-pulse to obtain a frequency equal to the frequency of the signal received at terminal 36.

Note in FIGURES 6(B) and (C) that solid line pulses are passed, while dashed line pulses are blocked by respective "and" gates.

On the other hand, consider the operation of FIGURE 2 when error voltage is provided from the phase detector 35 to indicate lack of synchronization. If a positive error voltage is provided from the phase detector, only the pulse duration from one-shot 43a is increased. Thus, in FIGURE6(D), pulse 95 from one-shot 43a has a duration corresponding to a particular amplitude of positive error voltage which causes gates 26a–k to block the first five pulses from taps $O_1$–$O_k$. There results a decrease of five pulses per generator pulse at the divider input to provide an effective deletion of five pulses, in FIGURE 5. Consequently, the divider output changes its phase in a lagging direction by an amount of 360°/S per deleted input pulse. Since a positive error voltage is involved, the other one-shot 43*b* does not change its pulse duration from its minimum value 97 shown in FIGURE 6(C).

However, a negative error voltage will extend only the pulse duration for one-shot 43*b*, which will permit one or more of the gates 27*a–k* to pass pulses from even taps $E_1$–$E_k$. Thus, in FIGURE 6(E), three pulses per generator pulse are permitted to pass from gates 27*a*, *b*, and *c*, due to one-shot duration 99. Consequently, three pulses will be added to the normal amount supplied from odd-tap gates 26*a–k* to the input of the divider, and its output will increase its phase in a leading direction by 360°/S per added pulse.

When a maximum positive error signal is provided, all of the pulses in gate bank 26 will be blocked. Consequently, no pulses will be provided to the divider, and the divider output lags by a maximum amount. On the other hand, when a maximum negative error signal is provided, all of the pulses from gates 27*a–k* will be provided in addition to all of the pulses from gates 26*a–k*, and the phase rate at the divider output will change in a leading direction by a maximum amount. FIGURE 6(F) illustrates the duration 98 for each output pulse from one-shot 43*b* when a maximum negative error voltage is provided to pass pulses from all taps.

If the division ratio R of rate divider 46 is greater than one, the rate of pulse deletions or additions to divider 32 is correspondingly reduced. That is, pulse durations of the one-shots are extended in response to the generator pulses only for every Rth pulse of generator 21. Between Rth generator pulses, the one-shots are not triggered; and only the normal odd-tap pulses are provided to divider 32. For example, if division rate R is four, every fourth divider pulse would trigger the one-shots, and the system output would approach synchronization at one-fourth the rate that it would if R were one.

The operation of the embodiment of FIGURE 2 can also be satisfactorily accomplished by having one-shots 43*a* and *b* provide pulses of maximum duration during zero error, with their duration being decreased by a phase detector output voltage. Then gates 27*a–k* normally would only pass even-tap pulses, and gates 26*a–k* normally would block odd-tap pulses. The duration is shortened for a respective one-shot by an increase in the respective positive or negative amplitude of the phase detector output. Hence, at maximum error voltage, the duration is minimum to not affect a respective bank of gates.

The principles of the invention have been described and illustrated in operative embodiments for the purpose of teaching those skilled in the art how the invention may be performed. Changes in the components, units and assemblies will appeal to those skilled in the art, and it is contemplated that such changes may be employed, but yet fall within the spirit and scope of the claims that are to follow:

I claim:

1. A synchronizer for locking and storing the phase of a locally-generated frequency with respect to an input signal comprising a local pulse source, a delay line having an input connected to said pulse source, a plurality of output taps distributed along said delay line, a plurality of "and" gates having inputs respectively connected to said taps, variable one-shot means having a controlled input and a trigger input, means connecting said trigger input to an output of said pulse source, an output of said one-shot means connected to other inputs of said "and" gates, a pulse rate divider having an input connected to outputs of said "and" gates, a phase detector having an input connected to an output of said divider, and an output of said phase detector connected to said controlled input of said one-shot means to control the duration of its output pulses, another input of said phase detector receiving said input signal, and an output of said synchronizer provided from said divider.

2. A synchronizer, as defined in claim 1, in which a second pulse divider is provided between said pulse source and said trigger input.

3. A synchronizer as defined in claim 1, in which said delay line has a length of about $$\frac{1}{f_0}$$

in which $f_0$ is the pulse rate of said pulse source.

4. A synchronizer, as defined in claim 3, in which said variable one-short means has an output pulse duration under synchronized conditions that blocks the outputs of less than all of said "and" gates.

5. A system, as defined in claim 1, in which said "and" gates are divided into first and second banks, with the first bank being connected to odd numbered taps, and the second bank being connected to even numbered taps alternately positions with respect to said odd numbered taps, said variable one-shot means comprising first and second one-shot circuits, means for connecting respective trigger inputs of said one-shot circuits to said pulse source, asymmetric conduction means connected respectively between controlled inputs of said one-shot circuits and a pair of outputs of said phase detector, said phase-detector outputs being segregated according to their initial polarity, only one of said one-shots being triggered at any one time, another input of each "and" gate in said first bank being connected to an output of said first one-shot circuit, and another input of each "and" gate in said second bank being connected to an output of said second one-shot circuit.

6. A synchronizer, as defined in claim 5 in which an inverter is connected in series with one of said asymmetric conduction means to segregate one phase-detector output.

7. A synchronizer, as defined in claim 5, in which a second pulse-rate divider is connected between said pulse source and the trigger inputs of said first and second one-shot circuits.

8. A synchronizer, as defined in claim 7, in which one group of gates is normally enabled and the other group of gates is normally disabled, with said one-shot circuits providing a maximum pulse duration when nulled outputs are provided from said phase detector.

9. A synchronizer, as defined in claim 7, in which one bank of gates is normally enabled and the other bank of gates is normally disabled, with said one-shot circuits providing a minimum pulse duration when a synchronized indicating output is provided from said phase detector.

References Cited in the file of this patent

UNITED STATES PATENTS

| | | |
|---|---|---|
| 2,516,888 | Levy | Aug. 1, 1950 |
| 2,592,308 | Meacham | Apr. 8, 1952 |
| 2,852,607 | Treadwell | Sept. 16, 1958 |